US 11,340,092 B2

(12) United States Patent
Colosky et al.

(10) Patent No.: US 11,340,092 B2
(45) Date of Patent: May 24, 2022

(54) WORK VEHICLE DISPLAY SYSTEMS AND METHODS FOR AUTOMATIC SECTION CONTROL LOOKAHEAD SYMBOLOGY

(71) Applicant: Deere & Company, Moline, IL (US)

(72) Inventors: Andrew M. Colosky, Urbandale, IA (US); Gregory J. Reinhart, Polk City, IA (US); Douglas J. Feldmann, Ankeny, IA (US); Adam E. Bogenrief, Des Moines, IA (US); Luciana Mueller, Des Moines, IA (US); Theodore J. Shinners, Altoona, IA (US)

(73) Assignee: DEERE & COMPANY, Moline, IL (US)

( * ) Notice: Subject to any disclaimer, the term of this patent is extended or adjusted under 35 U.S.C. 154(b) by 302 days.

(21) Appl. No.: 16/776,140

(22) Filed: Jan. 29, 2020

(65) Prior Publication Data

US 2021/0231453 A1 Jul. 29, 2021

(51) Int. Cl.
*G01C 21/36* (2006.01)
*G05D 1/02* (2020.01)
(Continued)

(52) U.S. Cl.
CPC .............. *G01C 21/367* (2013.01); *A01C 7/18* (2013.01); *G01C 21/32* (2013.01); *G05D 1/0212* (2013.01);
(Continued)

(58) Field of Classification Search
CPC ...... G01C 21/367; G01C 21/32; G01C 21/20; G01C 21/3804; A01C 7/18; A01C 21/005;
(Continued)

(56) References Cited

U.S. PATENT DOCUMENTS 6,125,775 A * 10/2000 Gust ................. A01B 63/22
111/52
6,199,000 B1 * 3/2001 Keller ................ A01C 21/005
701/50
(Continued)

FOREIGN PATENT DOCUMENTS

CA 2466563 A1 11/2004
EP 1865396 A2 12/2007
(Continued)

OTHER PUBLICATIONS

Zhang et al., Precision Agriculture Technology For Crop Farming book, Edited by Qin Zhang, Washington State University, CRC Press Taylor & Francis Group, https://books.google/books, Copyright 2016. (382 pages).
(Continued)

*Primary Examiner* — B M M Hannan
(74) *Attorney, Agent, or Firm* — Klintworth & Rozenblat IP LLP

(57) ABSTRACT

Work vehicle display systems and methods for generating map displays including automatic section control (ASC) lookahead symbology are disclosed. In embodiments, the work vehicle display system includes a display device on which a map display is generated, a position tracking data source, and a controller architecture. The controller architecture is operable in an ASC lookahead mode in which the controller architecture: (i) projects a future position of the work implement at a future timepoint based, at least in part, on data received from the position tracking data source; (ii) projects future operative states of the implement sections at the future timepoint when the implement sections are controlled by an ASC system; and (iii) generates ASC lookahead symbology on the map display visually indicating the (Continued)

projected future position of the work implement and the projected future operative states of the implement sections.

20 Claims, 6 Drawing Sheets

(51) Int. Cl.
  *H04W 4/029* (2018.01)
  *A01C 7/18* (2006.01)
  *G01C 21/32* (2006.01)
(52) U.S. Cl.
  CPC .... *H04W 4/029* (2018.02); *G05D 2201/0201* (2013.01)
(58) Field of Classification Search
  CPC .......... A01C 7/20; A01C 7/201; A01C 7/208; G05D 1/0212; G05D 2201/0201; H04W 4/029; A01B 79/005; A01B 69/008; A01M 7/0089
  USPC ....................................... 701/532
  See application file for complete search history.

(56) References Cited

U.S. PATENT DOCUMENTS

| | | | | |
|---|---|---|---|---|
| 6,553,312 | B2* | 4/2003 | Upadhyaya | A01C 21/005 342/357.31 |
| 7,311,004 | B2* | 12/2007 | Giles | A01C 23/047 73/592 |
| 8,583,315 | B2* | 11/2013 | Whitehead | G01S 5/0063 701/31.4 |
| 9,521,797 | B2* | 12/2016 | Ryder | A01B 63/002 |
| 2003/0187577 | A1* | 10/2003 | McClure | G01C 21/00 701/23 |
| 2006/0178820 | A1 | 8/2006 | Eglington et al. | |
| 2011/0210866 | A1* | 9/2011 | David | G08G 1/166 340/903 |
| 2014/0277676 | A1* | 9/2014 | Gattis | A01M 9/0076 700/114 |
| 2016/0377445 | A1* | 12/2016 | Rodoni | G06Q 10/0833 701/428 |
| 2017/0355264 | A1* | 12/2017 | Foster | A01B 69/00 |
| 2019/0150357 | A1* | 5/2019 | Wu | A01C 21/00 |
| 2019/0272762 | A1* | 9/2019 | Suddreth | G08G 5/0039 |
| 2019/0327878 | A1 | 10/2019 | Matsuzaki | |
| 2020/0201839 | A1* | 6/2020 | Lee | G06F 16/215 |
| 2020/0260634 | A1* | 8/2020 | Kovach | G05D 1/021 |
| 2020/0359550 | A1* | 11/2020 | Tran | G06F 3/017 |
| 2021/0200591 | A1* | 7/2021 | King | G06F 21/31 |

FOREIGN PATENT DOCUMENTS

| | | |
|---|---|---|
| EP | 3351901 A1 | 7/2018 |
| WO | WO2014151453 A1 | 9/2014 |

OTHER PUBLICATIONS

Asabe, Reducing Pesticide Over-Application with Map-Based Automatic Boom Section Control article, American Society of Agricultural and Biological Engineers, 53(3):685-690, www.researchgate.net/publication/258808611, May 2010, ResearchGate Copyright 2019. (1 page Abstract).

Joe Luck, Agricultural Sprayer Automatic Section Control (ASC) Systems article, University of Nebraska, Lincoln Extension EC718, Division of the Institute of Agriculture and Natural Resources, The Board of Regents of the University of Nebraska Copyright 2013. (6 pages).

European Search Report issued in counterpart application No. 20214237.8 dated Jun. 7, 2021 (17 pages).

* cited by examiner

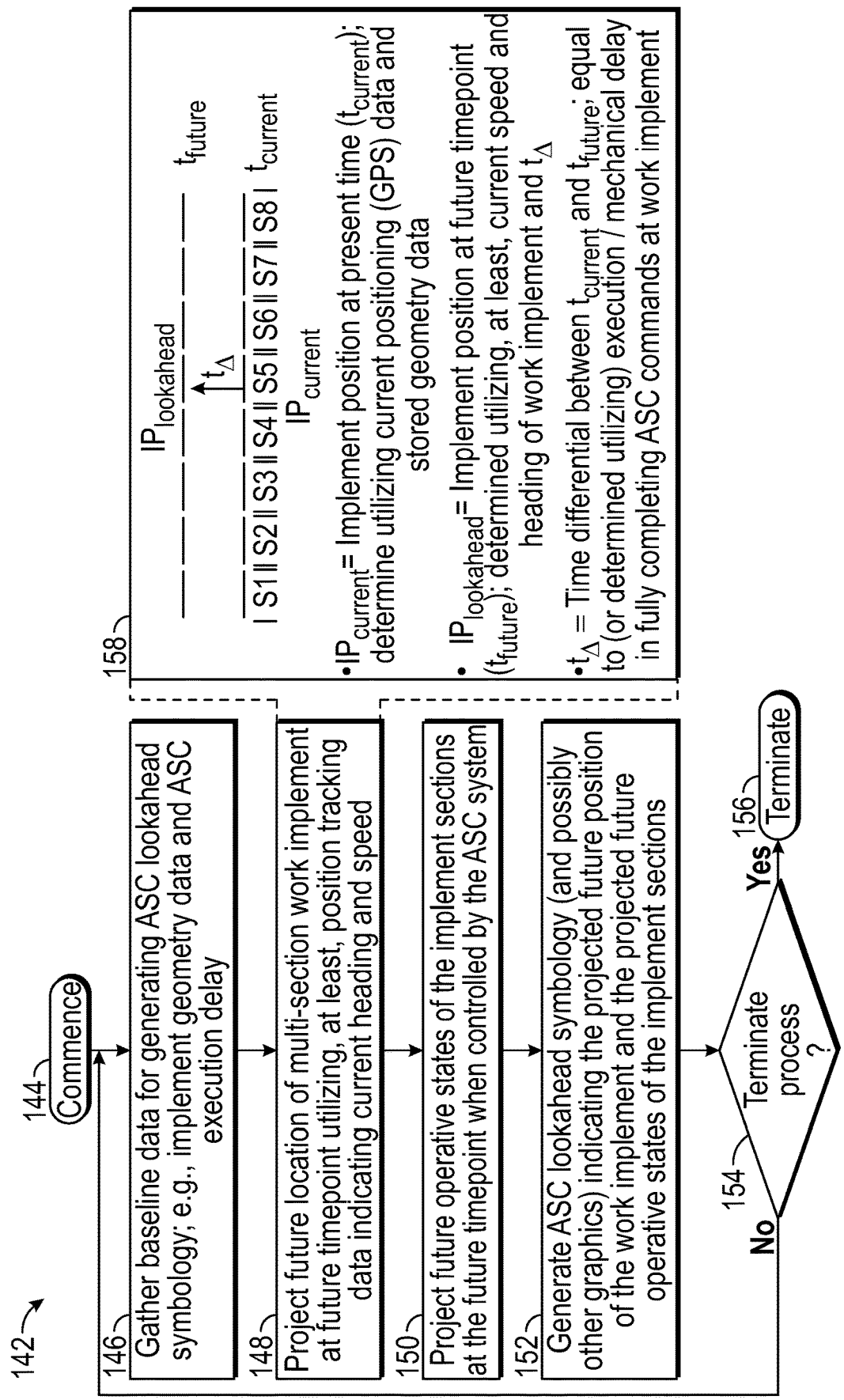

WORK VEHICLE DISPLAY SYSTEMS AND METHODS FOR AUTOMATIC SECTION CONTROL LOOKAHEAD SYMBOLOGY

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicle display systems and methods for generating map displays including automatic section control (ASC) lookahead symbology and other related graphics, which enhance operator awareness regarding the impact of operator driving behaviors on ASC performance levels.

BACKGROUND OF THE DISCLOSURE

Automatic section control (ASC) systems have been developed for usage in independently controlling the sections of a multi-section work implement as the work implement is moved by a work vehicle through a crop field or other agricultural space. Examples of multi-section work implements or "boom assemblies" beneficially controlled utilizing ASC systems include sprayer implements, air seeder implements, and certain tillage implements. Often, such multi-section work implements contain several independently-controllable sections, which collectively impart the work implement with a relatively wide wingspan to maximize coverage as the work implement travels across a field; e.g., larger sprayer implements, for example, may have wingspans approaching or exceeding 30 meters in certain instances. During operation, the ASC system independently controls the individual sections of the multi-section work implement to transition the implement sections between active and non-active states of operation at different points in time. In this manner, a well-designed ASC system can control the sections of a multi-section work implement with a speed and precision exceeding the capabilities of a human operator, particularly when the work implement includes a relatively large number of sections. The usage of an ASC system can thus increase the degree to which targeted areas of a field are treated (e.g., subject to seeding, tillage, spray solution application, or the like), while minimizing off-target treatment as the work implement is moved across the field by a work vehicle.

SUMMARY OF THE DISCLOSURE

Work vehicle display systems for generating map displays including automatic section control (ASC) lookahead symbology and other related graphics are disclosed. In embodiments, the work vehicle display system is utilized in conjunction with a multi-section work implement, which is moved by a work vehicle through an agricultural space and which has a number of implement sections independently controllable utilizing an ASC system. The work vehicle display system includes a display device utilized within an operator station of the work vehicle and on which a map display is generated, a position tracking data source configured to provide data indicative of a position of the multi-section work implement, and a controller architecture operably coupled to the display device and to the position tracking data source. The controller architecture is operable in an ASC lookahead mode in which the controller architecture: (i) projects a future position of the multi-section work implement at a future timepoint based, at least in part, on data received from the position tracking data source; (ii) projects future operative states of the implement sections at the future timepoint when the implement sections are controlled by the ASC system; and (iii) generates ASC lookahead symbology on the map display visually indicating the projected future position of the multi-section work implement and the projected future operative states of the implement sections.

In further embodiments, the work vehicle display system likewise includes a display device utilized within an operator station of the work vehicle and on which a map display is generated, a position tracking data source configured to provide data indicative of a position of the multi-section work implement, and a controller architecture operably coupled to the display device and to the position tracking data source. The controller architecture is configured to: (i) repeatedly estimate a performance level of the ASC system when the ASC system is utilized to actively control the multi-section work implement; and (ii) generate, on the map display, symbology representative of the estimated performance level of the ASC system.

Methods for generating ASC lookahead symbology and other related graphics are further disclosed. Embodiments of the method may be performed by a work vehicle display system including a display device operable in a work vehicle utilized to move a multi-section work implement, which has multiple implement sections independently controllable utilizing an ASC system. In at least some implementations, the method includes the steps or processes of: (i) projecting, utilizing data received from the position tracking data source, a future position of the multi-section work implement at a future timepoint; (ii) projecting, utilizing a controller architecture included in the work vehicle display system, future operative states of the implement sections at the future timepoint when the implement sections are controlled by the ASC system; and (iii) generating, on the display device, a map display including ASC lookahead symbology visually indicating the projected future position of the multi-section work implement and the projected future operative states of the implement sections.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures:

FIG. 6 is a flowchart of an example process or algorithm suitably carried-out by the work vehicle display system of FIG. 1 in generating the example ASC symbology shown in FIGS. 2-5.

Figure 1:
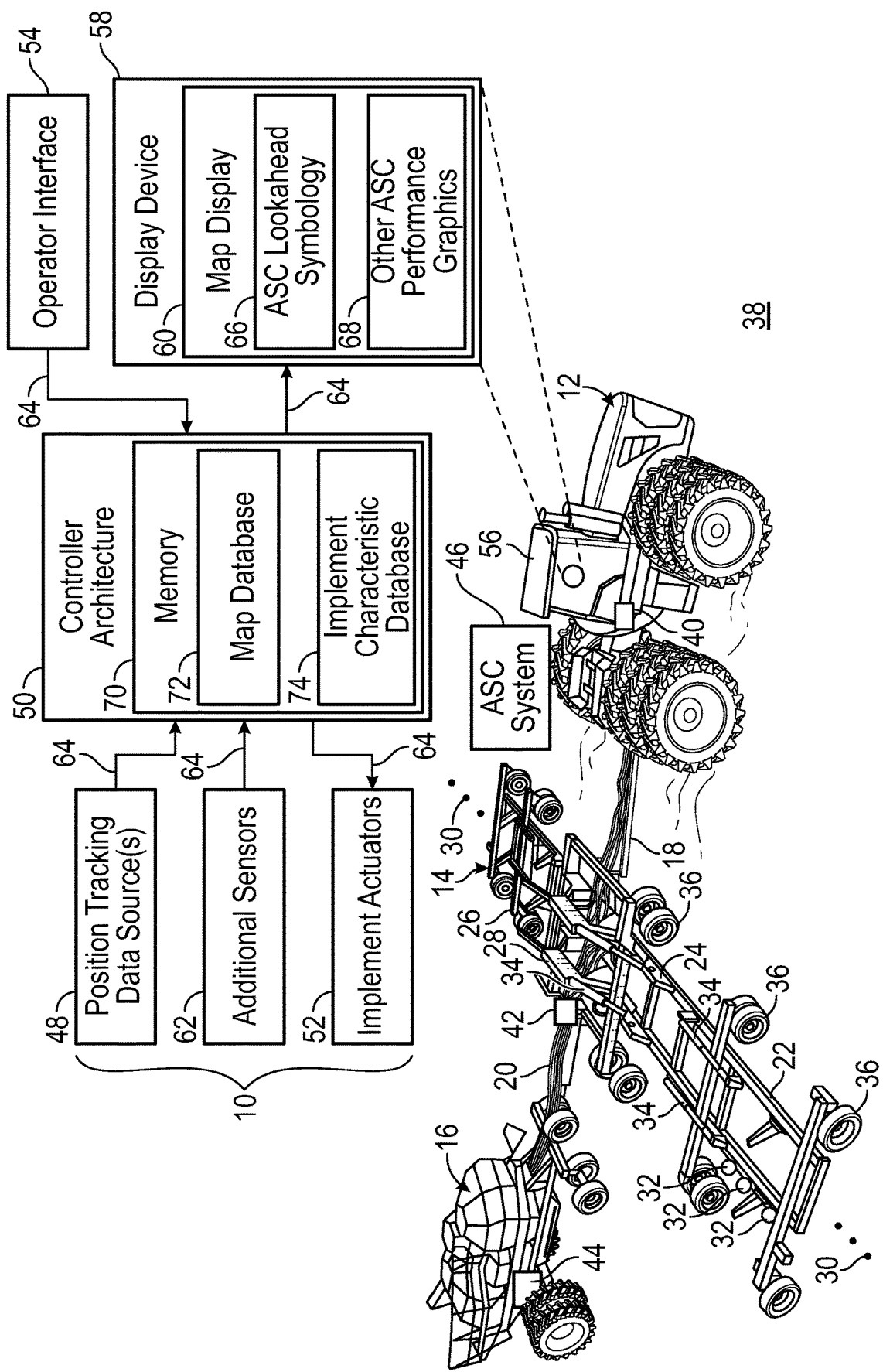
FIG. 1 illustrates an example work vehicle display system utilized in conjunction with a work vehicle (here, a tractor) and a multi-section work implement (here, a multi-section air seeder implement) controllable utilizing an Automatic Section Control (ASC) system.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

As appearing throughout this document, the term "display" refers to the composite imagery or "picture" generated on the screen of a display device, while the term "display device" refers to an image-generating device on which a display is presented. As further appearing herein, the term "multi-section work implement" refers to a work implement carrying multiple tools or treatment mechanisms (e.g., tillage tools, sprayer nozzles, airstream outlets, or the like) arranged in sections or groupings, with such sections or groupings separately controllable by an Automatic Section control (ASC) system. A multi-section work implement may be integrated into a work vehicle as in the case of, for example, a self-propelled sprayer. Alternatively, a multi-section work implement may be separate, freestanding machine, such as a multi-section tillage or air seeder implement, which is towed, pushed, or otherwise moved by a work vehicle through an agricultural space or other work area during usage.

As still further appearing herein, the term "agricultural space" refers to a crop field, an orchard, or another spatial area in which crops are grown. Reference to "treatment" of an agricultural space utilizing a multi-section work implement denotes that items within the agricultural space, typically plants or soil present within the space, are subject to an action supporting planting and growing operations, such as the act of seeding, tillage, or application of a spray solution (or other material). Thus, in the case of a multi-section sprayer implement, treatment of the agricultural space may include application of a spray solution (e.g., a solution containing fertilizer, herbicides, and/or pesticides) to the soil or plants within a field or a similar agricultural space. In the case of a multi-section air seeder implement, treatment of an agricultural space may include the delivery of seeds, as carried within pressurized airstreams, to furrows or other planting areas within a field. As a yet further example, in the case of a multi-section tillage implement, treatment of an agricultural space may include processing of field by physical engagement of tools with the ground or soil to, for example, agitate or loosen the soil to ready the field for planting.

Overview

As noted above, ASC systems have been developed for independently controlling the sections of a multi-section work implement as the work implement is moved through an agricultural space by a work vehicle. In many instances, an ASC system can increase the consistency with which targeted regions of a crop field or another agricultural space are subject to treatment, while concurrently decreasing the likelihood of inadvertent treatment of non-targeted regions of the agricultural space. This metric, on-target treatment versus off-target treatment by a multi-section work implement under the control of an ASC system, is referred to herein as "ASC performance levels." While ASC systems can improve the efficiency and precision with which agricultural spaces are treated utilizing multi-section work implements, ASC performance levels can become undesirably degraded in certain instances. Degradation in ASC performance levels can often be traced to difficulties in predicting operator driving behaviors as a multi-section work implement is moved over or across transition boundaries within agricultural spaces and around the periphery of agriculture areas; the term "transition boundary" referring to the boundary separating a first region of an agriculture space targeted for treatment utilizing a multi-section work implement from a second region of the agricultural space, which borders the first (targeted) region and which is not targeted for treatment. For example, when utilizing a multi-section air seeder implement to seed different regions of a field, a transition boundary may separate a first area of the field in which crops are planted and grown from a second area of the field not suitable for crop growing, such as headlands, waterways, roadways, and similar geographical features.

During operation, an ASC system predicts or forecasts, on an iterative basis, whether each section of a multi-section work implement will soon cross a transition boundary separating targeted and non-targeted area of an agricultural space. Typically, the ASC system renders this forecast by tracking the position, heading, and speed of the work implement utilizing a Global Positioning System (GPS) module and then comparing this information to stored map data, which identifies the targeted and non-targeted areas of the agricultural space. When determining that at least some of the sections included in the multi-section work implement will soon cross a transition boundary, the ASC system issues commands to the actuators associated with the implement sections to switch operative modes. As a more specific example, if projecting that a given section of a multi-section work implement will soon cross from a targeted area to a non-targeted area of a field, the ASC system may issue a command to the actuator or actuators associated with the implement section to halt treatment (e.g., tillage, seeding, or spray solution application) at the point in time at which the implement section is predicted to cross the transition boundary.

Notably, in many instances, commands issued by an ASC system cannot be instantaneously executed by the multi-section work implement. Rather, a temporal delay or time lag occurs between the point in time at which the ASC system initially issues a command and the subsequent point in time at which the command is fully carried-out at the multi-section work implement. The duration of this time period, herein the "command-to-execution lag period," can be relatively lengthy (e.g., exceeding 3 seconds) in certain instances due to, for example, the delay introduced by mechanical components of the multi-section work implement. A technical challenge thus arises as relatively pronounced changes in the speed or heading of the work vehicle during the command-to-execution lag period can result in appreciable mistiming of the ASC commands and the degradation of the ASC performance levels. Further, even in scenarios in which the command-to-execution lag period is relatively brief (e.g., less than 3 seconds), pronounced changes in the heading or speed of a multi-section work implement may degrade ASC performance levels when the work implement is traveling at a relatively high rate of speed, such as a speed exceeding 15 miles per hour (approximately 1.6 kilometers per hour). This may be problematic in higher speed operations, such as spraying operations performed utilizing self-propelled sprayers. In this latter case, the multi-section work (e.g., sprayer) implement covers a greater spatial area in a reduced amount of time, thus exacerbating the impact of mistimed ASC commands resulting from abrupt changes in the heading or speed of the work implement during the command-to-execution lag period.

The above-described technical challenge is difficult to address. Generally, it is impractical to reduce the command-to-execution lag period through modifications to the ASC system, to the multi-section work implement itself, or to other related components. Further, work vehicle operators are often unaware or merely vaguely aware as to the precise relationship between operator driving behaviors and ASC performance levels. Consequently, to help address this issue, the following provides work vehicle display systems and methods for generating map displays including unique symbology, which boosts operator awareness as to the manner in which operator driving behaviors impact (increase or decrease) ASC performance levels. For example, embodiments of the below-described work vehicle display system generate map displays including predictive symbology referred to herein as "ASC lookahead symbology." When generated on a map display, the ASC lookahead symbology provides an operator with a highly intuitive visual tool or indicator of a predicted position of a work implement at a future point in time (herein, a "future timepoint"), as well as the projected operative states of the implement sections at the future timepoint. The future timepoint may occur a set duration (e.g., n number of milliseconds) after the present time, with the set duration (n milliseconds) substantially equal to the applicable command-to-execution lag period. In this manner, an operator need merely glance at ASC lookahead symbology, as presented in the context of the map display, to quickly gain an awareness as to the manner in which the ASC commands will be implemented by the multi-section work implement in a near term timeframe. This, in turn, allows the operator to gain a better understanding as the manner in which operator driving behaviors (e.g., abrupt changes in speed brought about by rapid acceleration or deceleration or abrupt changes in heading brought about by over-steering or jarring steering) can skew the timing of ASC commands and impact ASC performance levels.

The particular manner in which the projected future implement position and the projected future operative states of the implement sections are calculated by the work vehicle display system will vary between implementations, as will the manner in which these parameters are visually expressed by the work vehicle display system on the map display. In one approach, the work vehicle display system generates the ASC lookahead symbology to include a future implement position graphic; that is, a symbol or other graphic denoting the predicted position of the multi-section work implement at the future timepoint in the context of the displayed map environment. The future position implement graphic may have a relatively simple appearance in embodiments (e.g., that of a line segment), while having a lateral width corresponding to the actual lateral width of the work implement, as reduced in size to fit the scale of the map display. The future position implement graphic is further advantageously generated to include a number of portions or segments corresponding to the sections of the work implement. During operation, a processing system or "controller architecture" of the work vehicle display system selectively modifies the appearance of the implement graphic segments to visually denote the projected future operative states of the corresponding sections of the multi-section work implement. For example, in one useful approach in which a pre-established color coding scheme is employed, a given segment of the future position implement graphic may be expressed in either (i) a first coded color indicating that the corresponding implement segment is projected to be in first operative state (e.g., in an active state) at the future timepoint, or (ii) a second coded color indicating that the corresponding implement segment is projected to be in a second operative state (e.g., an inactive state) at the future timepoint. In other embodiments, the appearance of segments of the future implement position graphic may be altered in another manner to visually connote different future operative states of the implement sections.

In embodiments, the work vehicle display system may further generate other graphic elements on the map display in addition to the future implement position graphic or other ASC lookahead symbology. Depending upon implementation, such additional graphic elements can include one or more of the following: (i) an icon indicating a current position of the work vehicle on the map display, (ii) a symbol or other graphic indicating a current position of the multi-section work implement on the map display (referred to below as the "current position implement graphic)," (iii) connecting line graphics or other graphics visually linking the outer ends of the current position implement graphic to corresponding outer ends of the future position implement graphic, and/or (iv) an operative state transition graphic visually identifying a juncture or division between sections of the work implement currently placed in different operative states. As a still further possibility, embodiments of the work vehicle display system may generate symbology or other graphics on the map display indicating an estimated, instantaneous performance level of the ASC system when commanding or controlling the multi-section work implement.

Examples of such additional graphics and the ASC lookahead symbology are described in detail below in connection with FIGS. 2-6. First, however, an example of a work vehicle display system integrated into a work vehicle, which is utilized to move a multi-section work implement through an agricultural space, is described below conjunction with FIG. 1. In the following example, the work vehicle and the multi-section work implement assume the form of a tractor and a multi-section air seeder implement, respectively. This notwithstanding, it is emphasized that embodiments of the work vehicle display system can be utilized in conjunction with various different types of work vehicles and multi-section work implements, providing that the work implement includes multiple sections that are independently controllable utilizing an ASC system. Further, all illustrated depictions and references to the appearance of the below-described symbology, graphic user interface (GUI) elements, and other such display elements are provided by way of non-limiting example only; such displayed elements or imagery will inevitably vary in appearance across different implementations and may be customizable to user or operator preferences in at least some instances.

Example Work Vehicle Display System for Generating Map Displays Including ASC Lookahead Symbology Referring to FIG. 1, an example embodiment of a work vehicle display system 10 is presented. The example work vehicle display system 10 is illustrated as integrated into a particular type of work vehicle (here, a tractor 12) and utilized with a particular type of work implement (here, a multi-section air seeder implement 14), but can be integrated into or utilized in conjunction with various other types of work vehicles and multi-section work implements in further embodiments. For example, the following description is equally applicable to other types of multi-section work implements (e.g., tillage implements) towable by the tractor 12 and to work implements integrated into other types of work vehicles, such as sprayer implements integrated into self-propelled sprayers.

A commodity or seed cart 16 is further provided in a train arrangement with the tractor 12 and the multi-section air seeder implement 14. A first tow connection 18 joins the tractor 12 to the multi-section air seeder implement 14. The tow connection 18 may include a drawbar and any number of hydraulic, pneumatic, or electrical connections providing hydraulic fluid, pressurized air, power, or electrical signals to components onboard the multi-section air seeder implement 14. Similarly, a second tow connection 20 joins the multi-section air seeder implement 14 to the commodity cart 16 and may again include any number of hydraulic, pneumatic, or electrical connections. In the illustrated example in which the multi-section work implement assumes the form of an air seeder implement, seeds may be held within a tank of the commodity cart 16 and supplied to the multi-section air seeder implement 14 via pressurized airstreams. In certain cases, other materials may also be contained in the seed-entrained airstreams. Electrical power and/or command signals may be provided to the air seeder implement 14 and/or to the commodity cart 16 by a processing system or "controller architecture" onboard the tractor 12, such as the below-described controller architecture 50.

A relatively limited, central portion of the multi-section air seeder implement 14 is shown in FIG. 1 for clarity. The illustrated central portion of the multi-section air seeder implement 14 includes three independently-controllable implement sections 22, 24, 26. The implement sections 22, 24 are located on a first (right) side of a central section or center frame 28 of the air seeder implement 14, while the implement section 26 is located on the opposing (left) side of the center frame 28 (the terms "left" and "right" defined with reference to an operator seated within the cabin 26 of the tractor 12). As indicated by ellipses 30, the multi-section air seeder implement 14 further includes a number of non-illustrated implement sections, which may be similar or substantially identical to the depicted implement sections 22, 24, 26. In many instances, the multi-section air seeder implement 14 will include six, eight, or more independently-controllable implement sections, which collectively impart the air seeder implement 14 with a relatively wide wingspan. This enables the multi-section air seeder implement 14 to treat (here, to deliver seed-entrained airstreams to) a relatively wide swath of land as the air seeder implement 14 is moved by the tractor 12 across a field 38 or through a similar agricultural space.

The implement section 22, 24, 26 of the multi-section air seeder implement 14 may each be constructed from a base frame (e.g., an assembly of metal or composite beams), which supports other components including one or more airstream outlets. For illustrative clarity, only a few airstream outlets 32 are generically depicted for the rightmost implement section 22 in FIG. 1. Additional airstream outlets 32 are likewise provided for the other implement sections 22, 24, 26 and generally positioned to impart the airstreams with a downward trajectory to the aft or rear of the air seeder implement 14. The implement sections 22, 24, 26 are further conveniently hingedly or pivotably joined at their junctures to allow the multi-section air seeder implement 14 to fold or otherwise transition from the deployed state shown in FIG. 1 to a more compact state suitable for transport. A number of hydraulic cylinders 34 may be provided to help transition the multi-section air seeder implement 14 between its deployed state (shown) and its more compact transport state. Multiple ground wheels 36 support the implement sections 22, 24, 26 when the multi-section air seeder implement 14 resides in the deployed state. Various other non-illustrated components may also be integrated into any or all of the implement section 22, 24, 26 including, for example, requisite plumbing features (e.g., air hoses and hydraulic lines), valves, valve actuators, and the like. This example description notwithstanding, the particular construction of the multi-section air seeder implement 14 (or other multi-section work implements) is generally inconsequential to embodiments of the present disclosure and should not be considered limiting in any respect, providing that the air seeder implement 14 includes multiple sections amenable to independent or individual control utilizing the below-described ASC system 46.

Describing next the example display system 10 in greater detail, the work vehicle display system includes at least one positioning tracking data source 48, a controller architecture 50, and a number of implement actuators 52 for switching the implement sections 22, 24, 26 between operative states, as described below. Additionally, the work vehicle display system 10 also includes an operator interface 54 located within a cabin 56 of the tractor 12, as well as a display device 58 operable within the cabin 56 and on which a map display 60 is generated. Any number of additional sensors 62 may also be included in the display system 10 and located onboard the tractor 12, onboard the multi-section air seeder implement 14, onboard the commodity cart 16, or a combination thereof. The connections between the controller architecture 50 and the various other components of the work vehicle display system 10 are denoted by signal communication lines 641. The signal communication lines 64 may represent any combination of wireless or wired connections over which data can be shared including, for example, a data bus onboard the tractor 12.

The work vehicle display system 10 is utilized in conjunction with an ASC system 46 associated with the tractor 12. The work vehicle display system 10 may be integrated into the ASC system 46, in whole or in part. Alternatively, the work vehicle display system 10 and the ASC system 46 may be separate and discrete systems, which cooperate or co-function through signal communication (at least to the extent that the example display system 10 is able to monitor the ASC system commands when generating the below-described symbology indicating the predicted future operative states of the implement sections 22, 24, 26). To generally encompass both of these possibilities, the ASC system 46 is generically illustrated as a separate box in FIG. 1 positioned adjacent the tractor 12. It will be understood, however, that the ASC system 46 and the display system 10 may be realized utilizing the same componentry in embodiments including, for example, the below-described controller architecture 50 and other computing components.

Regardless of the degree to which the systems 10, 46 are integrated, the work vehicle display system 10 and the ASC system 46 will typically be principally deployed onboard the tractor 12. However, the systems 10, 46 may also include or cooperate with components (e.g., actuators and sensors) integrated into the multi-section air seeder implement 14 and the commodity cart 16, as appropriate to monitor the position of the air seeder implement 14, to monitor the operative states of the implement sections 22, 24, 26, and to independently control the implement sections 22, 24, 26 in the manner described throughout this document. In this regard, electronics and other components 40, 42, 44 may be included in each of the tractor 12, the air seeder implement 14, and the commodity cart 16, with such components included in or interfacing with (e.g., providing data to) the work vehicle display system 10 in various implementations. As a first example, the positioning tracking data source 48 will typically include at least one GPS module deployed onboard the tractor 12, but may further include (or receive locationing data from) GPS module(s) onboard the multi-section air seeder implement 14 and/or the commodity cart 16 in certain instances. Similarly, in embodiments, the positioning tracking data source 48 can also include gyroscopic sensors, accelerometers, and other such Microelectromechanical (MEMS) devices, perhaps packaged as inertial measurement units (IMUs), affixed to the tractor 12, to the multi-section air seeder implement 14, and/or to the commodity cart 16. Various other sensors for monitoring position, orientation, or movement, such as inclinometers, can also be included in the positioning tracking data source 48 in embodiments of the display system 10. As a second example, the implement actuators 52 (e.g., flow control valve actuators in the illustrated example) can be deployed onboard the commodity cart 16, the air seeder implement 14, or at any location suitable for controlling pressurized airflow directed through the conduits connected to the airstream outlets 32.

With continued reference to FIG. 1, the controller architecture 50 of the work vehicle display system 10 can assume any form suitable for performing the functions described throughout this document. In this regard, the term "controller architecture," as appearing herein, is utilized in a non-limiting sense to generally refer to the processing architecture of work vehicle display system 10. The controller architecture 50 can encompass or may be associated with any practical number of processors (central and graphic processing units), control computers, navigational equipment pieces, computer-readable memories, power supplies, storage devices, interface cards, and other standardized components. The controller architecture 50 may also include or cooperate with any number of firmware and software programs or computer-readable instructions designed to carry-out the various process tasks, calculations, and control/display functions described herein. Such computer-readable instructions may be stored within a non-volatile sector of a computer-readable memory 70 associated with the controller architecture 50. While generically illustrated in FIG. 2 as a single block, the memory 70 can encompass any number and type of storage media suitable for storing computer-readable code or instructions, as well as other data utilized to support the operation of the work vehicle display system 10. The memory 70 may be integrated into the controller architecture 50 in embodiments as, for example, a system-in-package, a system-on-a-chip, or another type of microelectronic package or module.

The memory 70 may also store various other information useful in generating the map display 60, such as a map database 72 and an implement characteristic database 74. The map database 72 may store geographic information describing, among other items of information, the location and geometry of areas within an agricultural space desirably subject to treatment (e.g., seeding, spraying, or tillage), other areas of the agricultural space not desirably subject to treatment (e.g., headlands, waterways, roadways, and the like), and the transition boundaries separating such geographical areas. The map database 72 may also store information entered by a user (e.g., a crop grower or an operator of the tractor 12) in planning planting and growing operations, such as information describing the location and geometry of crop rows. Comparatively, the implement characteristic database 74 may store information pertaining to the multi-section air seeder implement 14 and, perhaps, other implements attachable to the tractor 12. Such information may include the geometry of the multi-section air seeder implement 14, particularly the width of the air seeder implement 14 and the relative locations of the implement sections 22, 24, 26. The implement characteristic database 74 may also store geometry information pertaining to dimension of the tow connection 18, which can be utilized by the controller architecture 50 to extrapolate the positioning of the multi-section air seeder implement 14 (and, therefore, the implement sections 22, 24, 26) relative to the tractor 12 when the GPS location of the tractor 12 is directly monitored. In still other embodiments, the memory 70 accessible to the controller architecture 50 may also store command-to-execution lag period values for the air seeder implement 14 (and possibly other interchangeable work implements), which the controller architecture 50 may utilize in performing the below-described calculations. Such data may be stored in the memory 70 during original manufacture, stored/updated in response to operator input received via operator interface 54, or stored/updated in response to software updates received over a non-illustrated network connection.

As noted above, embodiments of the work vehicle display system may be deployed onboard various different work vehicles, such as self-propelled sprayers, into which the ASC-controlled multi-section work implement is integrated; that is, assembled in a manner not intended for routine in-field removal or interchange. In other embodiments, the work vehicle display system may be at least partially deployed onboard a work vehicle utilized with a modular or independent multi-section work implement freely interchangeable with other work implements. In this latter regard, while the tractor 12 is depicted as towing a particular air seeder implement 14 in the example of FIG. 1, the tractor 12 can readily be utilized to tow (or otherwise move) various other types of multi-section work implements including tillage implements, row planter implements, and other (e.g., differently sized) air seeder implements. In such instances, the implement characteristic database 74 may store the above-described data (e.g., pertinent geometry data and, perhaps, a range of command-to-execution lag period values) for a variety of work implement types or categories. Such data can be stored within the memory 70 utilizing a multi-dimensional lookup table or another data structure. During operation of the work vehicle display system 10, the controller architecture 50 may then determine the implement type (or, perhaps, implement types) currently attached to the tractor 12 and then recall the corresponding data from the implement characteristic database 74 for usage during the ASC lookahead display process, an example of which is described below in connection with FIG. 6.

The operator interface 54 can be any device or group of devices utilized by an operator of the tractor 12 to input data into or otherwise control the work vehicle display system 10. In various implementations, the operator interface 54 may be integrated into or may be otherwise associated with the below-described display device 58. In this regard, the operator interface 54 may include physical inputs (e.g. buttons, switches, dials, or the like) located on or proximate the display device 58, a touchscreen module integrated into the display device 58, or a cursor input device (e.g., a joystick, trackball, or mouse) for positioning a cursor utilized to interface with GUI elements generated on the display device 58, as further described below. It should be understood that the operator interface 54, then, may include any number and type of operator input devices for receiving operator input commands including devices for interacting with GUIs, for receiving verbal input or voice commands, and/or for recognizing operator gesture commands, to list but a few examples. Comparatively, the display device 58 can be any image-generating device on which the below-described map display 60 is generated. The display device 58 may be affixed to the static structure of the operator cabin 56 and realized in a head-down display (HDD) configuration in embodiments. In other embodiments, the display device 58 can assume the form of a portable electronic display device, such as a tablet computer or laptop, which is carried into the operator station (e.g., the cabin 56 of the tractor 12) by an operator and which communicates with the various other components of the work vehicle display system 10 over a physical connection or wireless connection to perform the below-described display functionalities.

Figure 2:
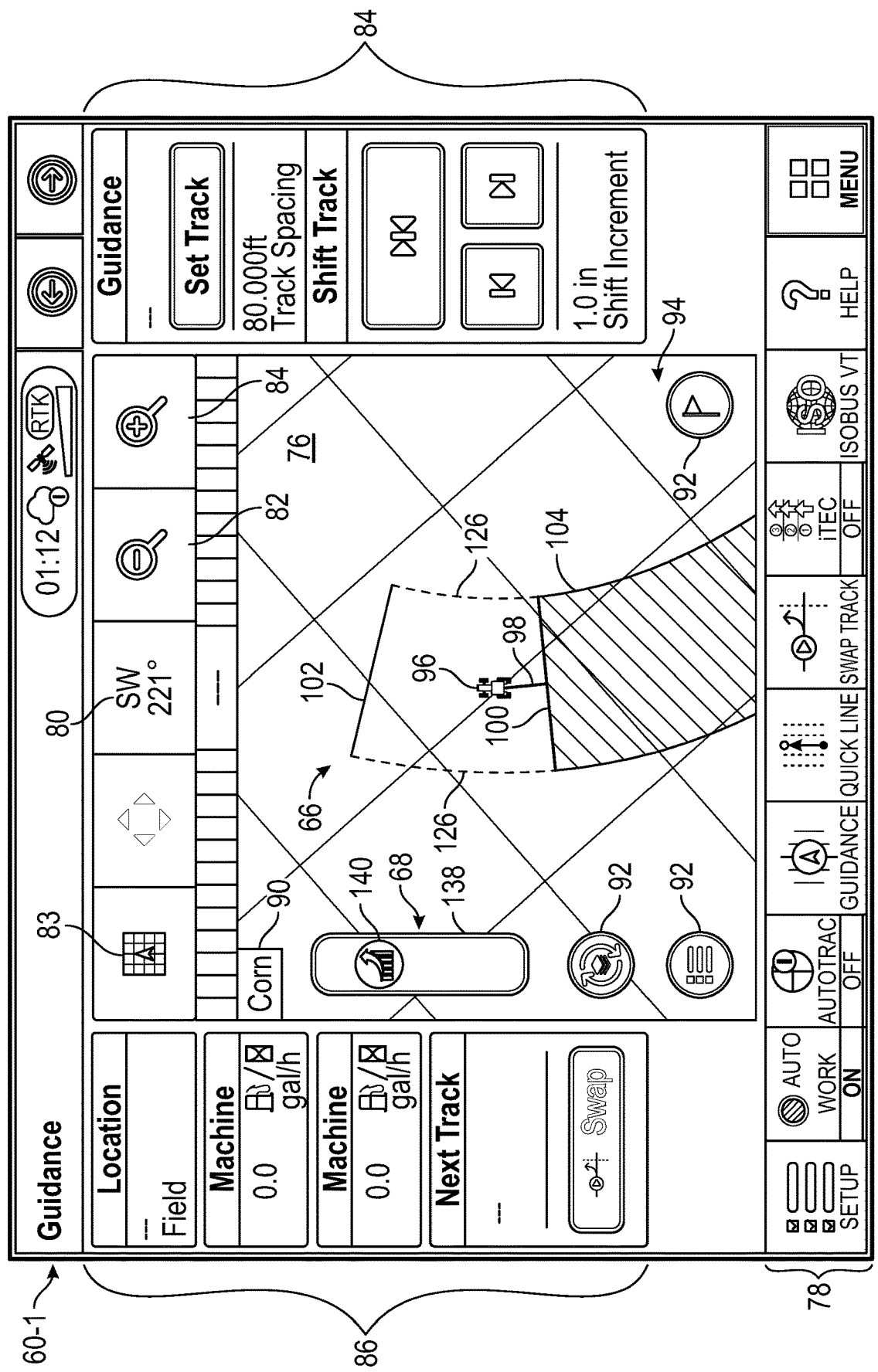
FIG. 2 illustrates a map display generated by the example work vehicle display system in a two dimensional, top-down format and including (among other graphics) ASC lookahead symbology, as illustrated in accordance with an example embodiment of the present disclosure.
Figure 3:
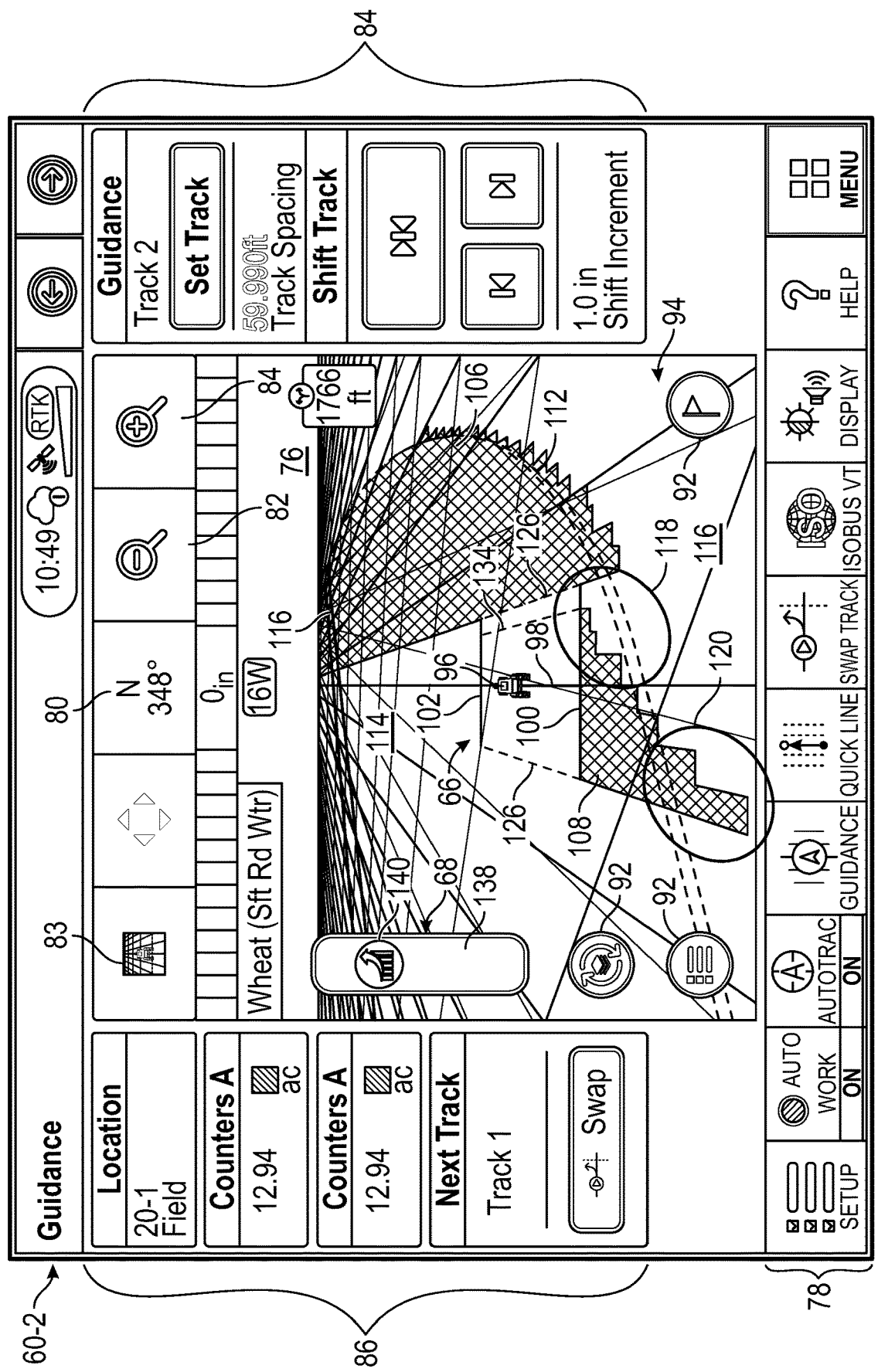
FIG. 3 illustrates a map display generated by the example work vehicle display system of FIG. 1 in a three dimensional, perspective format and including ASC lookahead symbology similar to that shown in the example of FIG. 2.

Examples of the map display 60, as generated by the work vehicle display system 10 to include the ASC lookahead symbology 66 and/or the other ASC performance graphics 68, will now be described in connection with FIGS. 2-5. The map display 60 can be produced in different formats, such as a two dimensional (e.g., top-down) format or a three dimensional (e.g., perspective or isometric) format, which may or may not be selectable by an operator. Further emphasizing this point, FIG. 2 illustrates a first example of the map display 60 (identified as "60-1") in which the mapped region or environment (as appearing in a main display area 76 of the map display 60-1) is presented in a two dimensional, top-down format. Comparatively, FIG. 3 illustrates a second example of the map display 60 (identified as "60-2") in which the mapped environment shown in the main display area 76 is presented in a three dimensional, perspective format.

Various windows, GUI widgets (virtual buttons, sliders, etc.), and the like are further generated adjacent or superimposed over the map displays 60-1, 60-2. Such graphic elements are generally inconsequential to embodiments of the present disclosure and are provided purely by way of non-limiting illustration; noting that the "look and feel" of the GUI and the map displays 60-1, 60-2 will vary among embodiments and may be customizable to operator preferences. For completeness, however, it is briefly observed that the map displays 60-1, 60-2 include the following graphic elements in the illustrated example. First, a lower row of virtual buttons 78 is provided to facilitate operator navigation between different GUI pages or screens, as well as to enable an operator to activate and deactivate different work vehicle functions. Along the topside of the display area, virtual buttons are provided for adjusting the field of view of the map displays 60-1, 60-2 (zoom buttons 82) and for turning on or off the map grid lines (button 83). Additionally, a heading or compass readout 80 is provided in an upper central location of the map displays 60-1, 60-2. Various windows 86, 88 are further generated on the left side of the map displays 60-1, 60-2 to, for example, present information pertaining to fuel efficiency (FIG. 2), to display counters (FIG. 3), or to present other pertinent data. On the right side of the map displays 60-1, 60-2, a cluster 84 of windows and GUI elements is provided for monitoring and selecting track parameters of the tractor 12; e.g., a track selection option may enable the selective activation of guidance lines including accompanying line numbers as shown for map line "16W" on the map display 60-2 of FIG. 3. Various other readouts may also be provided on the map displays 60-1, 60-2, such as a readout 90 indicating the crop type corresponding to the geographical region presented on the map displays 60-1, 60-2. Finally, a number of virtual buttons 92 are further provided for controlling various aspects of the displayed map; e.g., for changing the appearance of the map, for flagging areas of interest on the map, and for performing other map-related functions.

Terrain graphics 94 are produced in the main display area 76 of the map displays 60-1, 60-2. A grid overlay is fit onto the terrain graphics 94 and serves as a visual reference for quickly gauging changes in speed and heading of the tractor 12 and the multi-section air seeder implement 14 (FIG. 1). A work vehicle icon (here, a tractor icon 96) is further produced on the map displays 60-1, 60-2 and positioned within the display environment at a location corresponding to the real-world location of the tractor 12. So too are graphics 98, 100 representative of the tow connection 18 and the multi-section air seeder implement 14, respectively, generated on the map displays 60-1, 60-2. The graphic 98 (hereafter, the "tow connection graphic 98") is generally imparted with a length corresponding to the actual or real-world length of the tow connection 18, but reduced in size in accordance with the scale of the map displays 60-1, 60-2. In a similar manner, the graphic 100 (hereafter, the "current position implement graphic 100") is generated to have a width (measured along a lateral axis perpendicular to the direction of travel of the tractor 12) corresponding to the real-world width of the multi-section air seeder implement 14, but again reduced in size to the match scale of the map displays 60-1, 60-2. The controller architecture 50 may determine the width of the air seeder implement 14 (and the length of the tow connection 18) by recollection of this parameter from the implement characteristic database 74, by input received via the operator interface 54 during a set-up or calibration phase, or in another manner. The tow connection graphic 98 and the current position implement graphic 100 are generated as relatively simple line segments in the illustrated example for simplicity and display clarity. In other embodiments, the graphics 98, 100 may be generated to have a more realistic appearance (particularly, the current position implement graphic 100) or may otherwise vary in appearance from the illustrated embodiment.

Treated area graphics 104, 106, 108 are further generated on the map displays 60-1, 60-2. The treated area graphics 104, 106, 108 may be rendered as shaded regions or partially transparent, color-coded overlays covering the appropriate regions of the terrain graphics 94; that is, the regions of the terrain graphics 94 corresponding to the areas of a field (or another agricultural space) already treated utilizing a multi-section work implement during the current work operation or task. Thus, in the case of the multi-section air seeder implement 14 (FIG. 1), the treated area graphics 104, 106, 108 may identify the regions of a field to which seed-entrained airstreams have already been delivered via the multi-section air seeder implement 14. Referring specifically to the example scenario shown in FIG. 2, it can be seen that the illustrated portion of the treated area graphic 104 is depicted as a continuous band or strip having width matching that of the current position implement graphic 100 and also having a gently curved contour. This indicates that all sections of the air seeder implement 14 have actively delivered seed-entrained airstreams over the visible map region without interruption as the air seeder implement 14 and the tractor 12 have traveled in a forward direction, while turning slightly to the right in the scenario of FIG. 2.

Comparatively, in the example scenario of FIG. 3, the treated area graphics 106, 108 are separated by a discontinuity or gap. This discontinuity between the treated areas graphics 106, 108 was created during tractor turnaround as the ASC system 46 temporarily switched all sections of the air seeder implement 14 into a non-active or off state to, for example, prevent seeding of the headlands between seeding passes. This may be more fully appreciated by referring to boundary lines 110, 112, which are mapped to the terrain graphics 94 in the map display 60-2 (FIG. 3). Here, the boundary lines 110, 112 demarcate the division or juncture between regions 114 of the terrain/field desirably targeted for treatment (here, seeding) and other regions 116 of the terrain/field not desirably subject to treatment (seeding), such the headlands, waterways, or roadways. In the illustrated example, the boundary line 110 marks the outer boundaries of a waterway or roadway passing through a plantable field. Comparatively, the boundary line 112 (located closer to the viewer in the example of FIG. 3) signifies the boundaries of a headland area 116, which borders the plantable areas of the field and which should not be seeded. The block-like or stepped appearance of the edges of the treated area graphic 106 is created due to the manner in which the ASC system 46 has commanded different implement sections of the air seeder implement 14 to switch between operative states at different junctures in time.

With continued reference to the example scenario of FIG. 3, an operator has piloted the tractor 12 in a manner resulting in mistiming of the ASC commands and imprecise treatment of the field by the multi-section air seeder implement 14. Specifically, due to abrupt changes in the heading of the tractor 12 (e.g., execution of the tractor turnaround with an overly tight turn radius) and/or due to abrupt changes in the speed of the tractor 12 (e.g., rapid acceleration or deceleration through the turnaround), the ASC commands have become mistimed in at least two regions or areas of the field, which are generally identified by circles 118, 120 in FIG. 3. In the circled region 118, targeted areas of the field adjacent the boundary lines 112 have been inadvertently omitted from seeding. Conversely, in the circled region 120, areas of the headlands 116 have been inadvertently seeded resulting in wasted materials. Both of these conditions detract from ASC performance levels, reducing the efficiency and precision of the seeding operation. It is thus desirable to only impart the operator with an awareness of these conditions (as is largely accomplished by graphics 94, 108, and 112), but also to enhance operator understanding as to the underlying causes of such off-targeted and missed-target events as they pertain to the operator's driving behaviors. This, in turn, afford the operator with an opportunity to modify the operator's driving behavior in the future and improve ASC performance levels; e.g., by reducing abrupt changes in speed and heading (as may be caused by over-steering) as the multi-section air seeder implement 14 approaches and travels through transition boundaries within the field 38. For at least this reason, embodiments of the work vehicle display system 10 (FIG. 1) further generate map displays 60-1, 60-2 to include one or both of the ASC lookahead symbology 66 and the instantaneous ASC performance symbology 68, as further discussed below.

Figure 4:
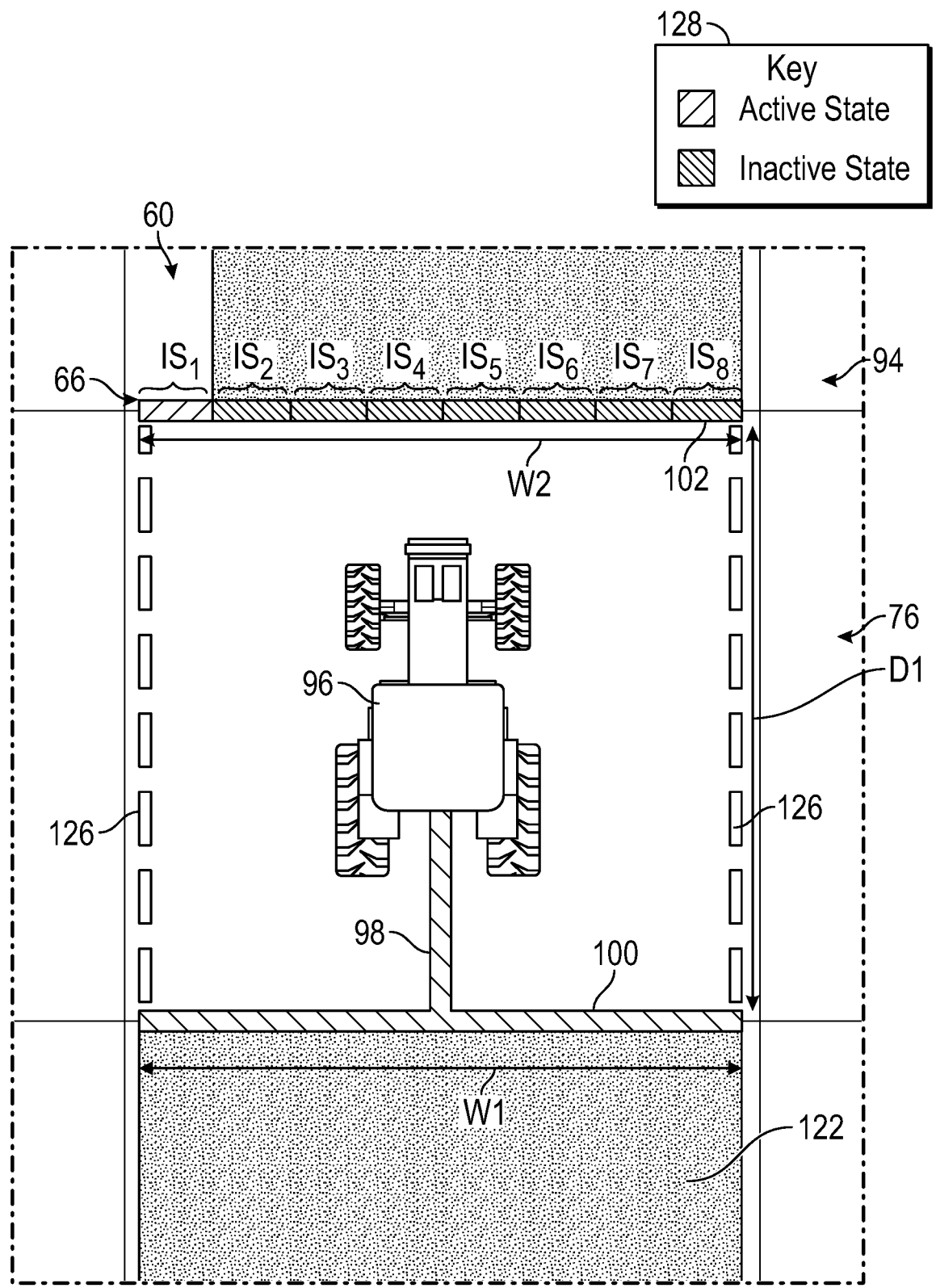
FIGS. 4 and 5 are close-up views of the example ASC symbology (shown in a top-down format) that may be generated by the example work vehicle display system (FIG. 1) in different operational scenarios.
Figure 5:
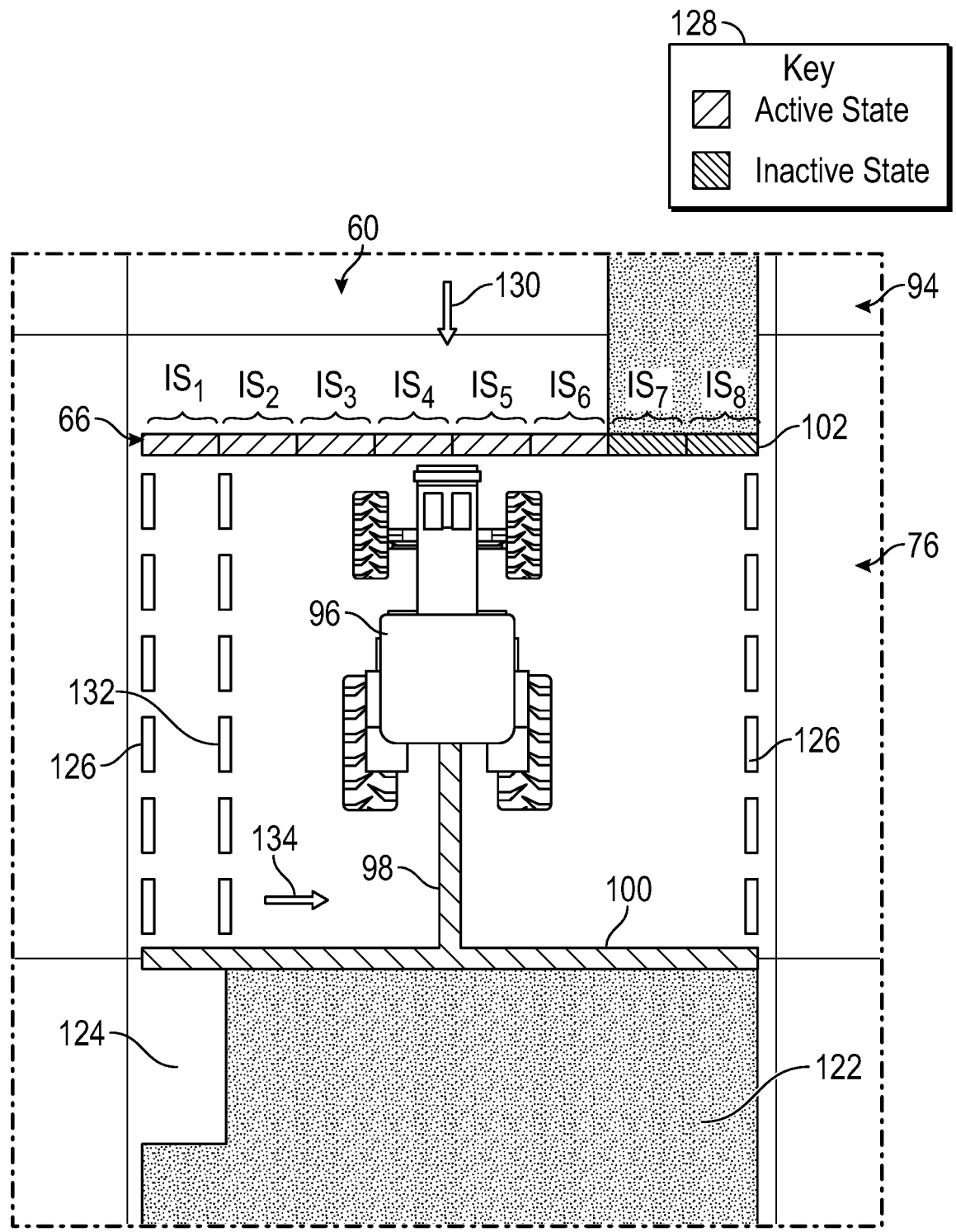

Describing first the ASC lookahead symbology 66, and referring now also to FIGS. 4 and 5, this symbology is generated to assume the form of or to include a future position implement graphic 102 in the illustrated embodiment. As previously indicated, the future position implement graphic 102 represents the predicted or forecast position of the multi-section air seeder implement 14 at a future timepoint, whereas the current position implement graphic 102 marks the position of the air seeder implement 14 at the current point in time. For rapid visual association, the future position implement graphic 102 and the current implement position graphic 100 may be imparted with similar or substantially identical appearances; e.g., in one implementation, the future position implement graphic 102 may be generated as a line graphic substantially matching the current position implement graphic 100, but rendered in different colors in accordance with a pre-established color coding scheme (e.g., the current implement position graphic 100 may be color coded green, while segments of the future position implement graphic 102 is color coded orange or white, as described below). As a corollary, both the future position implement graphic 102 and the current implement position graphic 100 may also have lateral widths corresponding to the real-world width of the multi-section air seeder implement 14, but fit to the scale of the map displays 60-1, 60-2. Additionally, in certain embodiments, connecting line graphics 126 may be generated to generally extend from the opposing outer ends of the current position implement graphic 100 to corresponding outer ends of the future position implement graphic 102. The provision of connecting line graphics 126 thus further helps establish an intuitive visual association between the future position implement graphic 102 and the current implement position graphic 100, particularly when the tractor 12 and the air seeder implement 14 are turning, as shown in FIG. 2.

During operation of the work vehicle display system 10, the controller architecture 50 alters or modifies the appearance of different portions or segments of the future position implement graphic 102 to indicate the projected future operative state of each implement section of the multi-section air seeder implement 14. For example, in certain embodiments, the controller architecture 50 may be configured to alter the appearance of the segments of the future position implement graphic 102 in accordance with a pre-established color coding scheme in which first and second coded colors denote different operational states of the implement sections of the multi-section air seeder implement 14. For example, as labeled in FIGS. 4 and 5, the future position implement graphic 102 may be divided into a number of portions or segments corresponding to the sections of the multi-section air seeder implement 14. For the purposes of illustration, it may be assumed that the multi-section air seeder implement 14 contains eight implement sections; and, correspondingly, the future position implement graphic 102 is generated to include eight implement segments, which are labeled as "$IS_8$" through "$IS_8$" in FIGS. 4 and 5. Each segment ($IS_{1-8}$) of the future position implement graphic 102 thus corresponds to an independently-controllable section of the multi-section air seeder implement 14, noting specifically that the position and the lateral width of each implement segment corresponds to the real-world position and width (scaled) of the sections of the multi-section air seeder implement 14. More generally, and as previously indicated, both the lateral width of the current position implement graphic 100 (identified by arrow $W_1$ in FIG. 4) and the lateral width of the future position implement graphic 102 (identified by arrow $W_2$ in FIG. 4) may be equivalent, with these widths matching the actual width of the air seeder implement 14 (reduced in size to match the scale of the map displays 60-1, 60-2).

As indicated by a key 128 appearing in the upper left of FIGS. 4 and 5, the segments of the future position implement graphic 102 are color coded to visual connotate different future operative states of the implement sections. Accordingly, one or more of the segments ($IS_{1-8}$) of the future position implement graphic 102 may be generated in a first coded color (e.g., white) to indicate that the corresponding implement section(s) of the multi-section air seeder implement 14 will be placed in an active (seeding) state at the future timepoint; again, the future timepoint representing the point in time at which the air seeder implement 14 will arrive at the future position denoted by the future position implement graphic 102. Conversely, one or more of the segments ($IS_{1-8}$) of the future position implement graphic 102 are generated in a second coded color (e.g., orange) to indicate that the corresponding implement section(s) will be placed in an (non-seeding state) inactive state at the future timepoint. In the example scenario of FIG. 4, only one implement segment ($IS_1$) of the future position implement graphic 102 is color coded in the first color, thereby indicating that only the corresponding implement section (the first implement section moving from the right to left in the drawing figures) will be active at the future timepoint due to the commands issued by the ASC system 46. In contrast, in the example scenario of FIG. 5, the first six implements segments ($IS_1$ through $IS_6$) are rendered in the first coded color, indicating the corresponding implement section will be active at the future timepoint. An operator can thus quickly glance at the future position implement graphic 102 to gain an appreciation for the predicted future operative states of the implement sections when under control of the ASC system 46.

In the illustrated example, two coded colors are utilized to indicate whether a particular section of the multi-section air seeder implement 14 is currently delivering seeds or has instead halted seeding in accordance with ASC commands. In other embodiments, a similar, relatively simple color coding scheme can be utilized to distinguish between the operative states of implement sections contained in other types of multi-section work implements. As a first example, in instances in which the tractor 12 (or other work vehicle, such as a self-propelled sprayer) is utilized in conjunction with a multi-section sprayer implement, the first coded color may indicate that an implement section is currently delivering a spray material to the environment (that is, spraying plants or soil located within the environment), while the second coded color indicates that an implement section is not currently delivery the spray material. As a second example, in implementations in which the tractor 12 (or other work vehicle) is utilized in conjunction with a multi-section tillage instrument, the first coded color may indicate that an implement section is currently engaged into a field to agitate or displace localized regions of the soil, while the second coded color indicates that an implement section is not currently engaged into the field. Further, more complex color coding schemes are also possible in which three or more coded colors are utilized to distinguish between different rates of material delivery (in the case of, for example, air seeders and sprayer implements), the delivery of different types of materials or material combinations, or the application of varying levels of pressure or penetration depths (in the case of multi-section tillage implements). As a still further possibility, the segments of the future position implement graphic 102 may be visually modified to indicate different operative states in various other manners in further implementations, such as by the introduction of additional graphics or icons adjacent implement segments corresponding to implement sections having active future operative states. Additionally or alternatively, an animation effect (e.g., a flashing effect) can be selectively applied to segments of the future position implement graphic 102 to visually distinguish between future operative states of the implement sections.

As previously stated, the future position implement graphic 102 shown in FIGS. 2-5 represents a predicted future position of the multi-section air seeder implement 14 at a future timepoint. The future timepoint may be determined based, at least in part, on a command-to-execution lag period occurring between issuance of a command by the ASC system 46 and execution of the command at the multi-section air seeder implement 14. In certain embodiments, the future timepoint may be substantially equal to a current point at time (that is, the time at which the ASC projects the future position) plus the command-to-execution lag period. Examples of processes for determining the future timepoint are discussed more fully below in connection with FIG. 6. With this in mind, the positioning of the future position implement graphic 102 ahead of the current position implement graphic 100 will be principally determined by: (i) the duration of the command-to-execution lag period, and (ii) the predicted speed (and, to a lesser extent, the predicted heading) of the tractor 12 over the command-to-execution lag period.

As the command-to-execution lag period increases in duration, the distance or longitudinal separation between the future position implement graphic 102 and the current position implement graphic 100 will increase such that the future position implement graphic 102 moves further ahead of the current position implement graphic 100. This distance is called-out in FIG. 4 by double-headed arrow $D_1$. Similarly, as the speed of the tractor 12 and the multi-section air seeder implement 14 increases, the separation or distance ($D_1$) between graphics 100, 102 will likewise increase. As a corollary, as the speed of the tractor 12 and the multi-section air seeder implement 14 varies during implement usage, the work vehicle display system 10 will adjust the distance ($D_1$) accordingly such the future position implement graphic 102 appears to actively move closer to or further from the current position implement graphic 100 and the tractor icon 96, as the case may be. For example, the example scenario of FIG. 4 may represent a first point in time at which the tractor 12 and the multi-section air seeder implement 14 are traveling at a higher rate of speed, while the example scenario of FIG. 5 represents a subsequent point in time after which the tractor 12 and the multi-section air seeder implement 14 have decelerated to a slower rate of speed. This results shortening of distance $D_1$ and perceived translational movement of the future position implement graphic 102 toward the current position implement graphic 100 and the tractor icon 96, as indicated in FIG. 5 by an arrow 130.

In certain embodiments, the controller architecture 50 may further generate the map display 60 to include one or more graphics visually conveying the current operative state of the implement sections. In one approach, the controller architecture 50 may vary the appearance of different segments of the present implement position graphic 100 in a manner similar to that just described in connection with the future implement position graphic 102. In other embodiments, the controller architecture 50 may instead generate an operative state transition graphic 132 on the map display 60, which generally identifies a point along the multi-section air seeder implement 14 separating one group of implement sections (or a single implement section) in a first operative state from another group of implement sections (or single implement section) in a second operative state. Consider, for example, the operative state transition graphic 132 shown in FIGS. 3 and 5. Here, the operative state transition graphic 132 is generated as a dashed line (e.g., having a similar appearance to the connecting lines 126) that extends from a point on the current position implement graphic 100 toward the future position implement graphic 102. Further, an arrow 134 (FIG. 5) further indicates the manner in which the operative state transition graphic 132 may move laterally as an increasing number of the implement sections of the multi-section air seeder implement are switched into an operative state; here, switched into an inactive or non-seeding state, as may be appreciated by referencing the corresponding gap 124 in the treated area graphic 124 shown in FIG. 5. In further embodiments, different graphics may be utilized to indicate the current operative states of the current position implement graphic 100 or such graphics may be omitted from the map displays 60-1, 60-2 entirely.

In addition to or in lieu of the above-described ASC lookahead symbology 66, embodiments of the work vehicle display system 10 may further generate estimated performance level symbology 68, which provide an instantaneous estimate of the ASC performance levels. An example of such symbology 68 is further shown in FIGS. 3 and 4, as superimposed over the terrain graphics 94 and located within the main display area of the map displays 60-1, 60-2. In this particular example, the performance level symbology 68 is generated as a vertical gauge or similar graphic including a vertically-elongated passageway 138 in which an elevator or marker 140 may slide. Movement of the marker 140 toward the upper portion of the passageway 138 indicates a higher ASC performance level, whereas movement of the marker 140 toward the bottom of the passageway 138 indicates a lower ASC performance level. During operation of the work vehicle display system 10, the controller architecture 50 repeatedly estimate a performance level of ASC system 46 when controlling the multi-section air seeder implement 14. The controller architecture 50 then generates, on the map display 60, symbology 136 representative of the estimated ASC performance level. In embodiments, the controller architecture 50 may estimate the ASC performance level by assessing the degree to which the targeted areas of a field or other agricultural space are treated when passed over by the multi-section work implement, while the multi-section work implement is under control of the ASC system 46. Additionally, the ASC performance level estimate may also take into account off-target treatment of areas within the agricultural space. In further embodiments, the controller architecture 50 may not generate such estimated performance level symbology 136 on the map display 60 or may impart such symbology 136 with a different appearance, such as that of a virtual needle gauge.

Turning lastly to FIG. 6, there is shown an ASC lookahead display process 142 suitably carried-out by the controller architecture 50 (FIG. 1) in generating the map displays 60-1, 60-2 in embodiments of the present disclosure. The ASC lookahead display process 142 includes a number of process STEPS 144, 146, 148, 150, 152, 154, 156, each of which is described, in turn, below. Depending upon the particular manner in which the ASC lookahead display process 142 is implemented, each step generically illustrated in FIG. 6 may entail a single process or multiple sub-processes. Further, the steps illustrated in FIG. 6 and described below are provided by way of non-limiting example only. In alternative embodiments of the ASC lookahead display process 142, additional process steps may be performed, certain steps may be omitted, and/or the illustrated process steps may be performed in alternative sequences.

The controller architecture 50 commences performance of the ASC lookahead display process 142 at STEP 144 in response to the occurrence of a predetermined trigger event. Generally, the ASC lookahead display process 142 may be triggered by activation of an ASC lookahead mode; that is, a mode in which the work vehicle display system 10 is instructed to generate a map display including ASC lookahead symbology. The work vehicle display system 10 may operate in the ASC lookahead mode by default in embodiments. Alternatively, the work vehicle display system 10 may operate in the ASC lookahead mode when so commanded or instructed by operator input. For example, in this latter regard, an operator may be permitted to activate and deactivate (or customize) display of the ASC symbology in embodiments as, for example, a map layer that can be turned on (and thus displayed) or off (and thus suppressed) through interaction with a settings page or screen accessible utilizing the GUI of the display application.

After commencing the ASC lookahead display process 142 (STEP 144), the controller architecture 50 advances to STEP 146. During STEP 146, the controller architecture 50 gathers the data utilized to generate the ASC lookahead symbology 66, the ASC performance symbology 68 (if applicable), and the other graphics appearing on the map displays 60-1, 60-2. Again, this data may include positioning or locationing data provided from the position tracking data source 48 indicative of the current heading, speed, and position of the multi-section air seeder implement 14. In many instances, the current heading, speed, and position of the tractor 12 will be directly monitored by a GPS module included in the position tracking data source 48 and geometry data recalled from the memory 70 (specifically, form the implement characteristic database 74) will then be utilized to determine the corresponding metrics for the sections of the multi-section air seeder implement 14. Other data may also be considered indicating the position, acceleration, and orientation of the air seeder implement 14, such as data received from inclinometers or IMUs affixed to the air seeder implement 14 and/or the tractor 12. Data may also be recalled form the memory 70 indicating other pertinent parameters, such as the length of the command-to-execution lag period and dimensions from which the respective locations of the implement sections can be extrapolated from the tractor position (with appropriate adjustments made if the tractor 12 and/or the air seeder implement 14 are engaged in a turn).

Next, at STEP 150, the controller architecture 50 projects the future location of the multi-section air seeder implement 14 at the future timepoint the pertinent data gathered during STEP 146. An example method for rendering this projection is presented on the right side of FIG. 6 in a detail bubble 158. As indicated, the controller architecture 50 may forecast the future location of each implement section based on the current heading, speed, and position of the multi-section air seeder implement 14. Speed and heading trends (e.g., whether the tractor 12 and the air seeder implement 14 is currently accelerating or decelerating) may also be considered, as may the impact of geographical topology if such information is stored within the map database 72. This information may then be utilized to extrapolate the future position of each implement position at the future timepoint. As previously indicated, the future timepoint occurs n number of seconds (e.g., expressed as milliseconds) after a present point in time; that is, the point in time at which the controller architecture renders this projection. In embodiments, n number of seconds is assigned a value equal to or substantially equal to the command-to-execution lag period. Stated differently, and as indicated in the detail bubble 158, if the current time is equal to $t_{current}$ and command-to-execution lag period is equal to n number of millisecond, the projected future time ($t_{future}$) occurs n milliseconds after $t_{current}$.

The controller architecture 50 command-to-execution lag period in various manners. In embodiments, the controller architecture 50 may recall a default value for the command-to-execution lag period from memory 70. Further, in implementations in which a work vehicle (e.g., the tractor 12) may be utilized in conjunction with multiple different interchangeable work implements, the controller architecture 50 may first identify an implement type currently attached to the work vehicle and then utilize the implement type to recall a corresponding command-to-execution lag period stored in the memory, with the memory 70 storing multiple lag periods referenced to different implement types within the implement characteristic database 74. In this case, the controller architecture 50 may identify the implement type automatically based on sensor data provided by the additional sensors 62 or, instead, may determine the implement type based on operator input received via the operator interface 54. In still other embodiments, the command-to-execution lag period may be determined based on operator input or measured utilizing sensor input. Various combinations of the foregoing approaches may also be employed such that, for example, the controller architecture 50 may adjust or calibrate a default value for the command-to-execution lag period (that is, lengthen or shorten the duration of the default value) based on operator input and/or pertinent sensor data.

Next, at STEP 150 of the ASC lookahead display process 142, the controller architecture 50 projects the future operative states of the implement sections at the future timepoint by, for example, monitoring the commands issued by the ASC system 46. The controller architecture 50 then proceeds to STEP 152 and generates the ASC lookahead symbology 66, the ASC performance symbology 68, and the other symbology on the map display 60-1, 60-2 in the manner previously described. Specifically, with respect to the ASC lookahead symbology 66, the controller architecture 50 generates the future position implement graphic 102 (FIGS. 2-5), while color coding or otherwise visually distinguishing between different segments of the implement graphic 102 to convey the future operative states of the implement sections. Lastly, the controller architecture 50 of the work vehicle display system 10 progresses to STEP 154 of the ASC lookahead display process 142 (FIG. 6). During STEP 154, the controller architecture 50 determines whether termination of the ASC lookahead display process 142 is warranted; e.g., due to operator input requesting termination of the process 142 or due to shutdown of the tractor 12 or the multi-section air seeder implement 14. If determining that the ASC lookahead display process 142 should be terminated, the controller architecture 50 progresses to STEP 156 and terminates the current iteration of the ASC lookahead display process 142 accordingly. Otherwise, the controller architecture 50 returns to the STEP 146 and the above-described process steps of the ASC lookahead display process 142 repeat.

By performing the ASC lookahead display process 142 in the above-described manner, the controller architecture 50 may repeatedly update the map displays 60-1, 60-2 on a relatively rapid (e.g., real-time) basis to include one or both of the ASC lookahead symbology 66 and the ASC performance symbology 68. The ASC lookahead symbology 66 and the ASC performance symbology 68 increase operator awareness as to the manner in which operator driving behaviors impact ASC performance levels, particularly as a multi-section work implement (e.g., the above-described multi-section air seeder implement 14) is moved by the work vehicle through transition boundaries present in an agricultural space. The ASC lookahead symbology 66, specifically, serves an intuitive visual tool in training operators to avoid or reduce driving behaviors resulting in abrupt changes in speed (as caused rapid acceleration or deceleration) or heading (as caused by jarring steering, over-steering, or other such abrupt steering inputs) that would otherwise degrade ASC performance levels. ASC performance and overall operator satisfaction levels may be boosted as a result.

Enumerated Examples of the Work Vehicle Display System

The following examples of the work vehicle display system, which selectively generates ASC lookahead symbology, are further provided and numbered for ease of reference.

1. A work vehicle display system utilized in conjunction with a multi-section work implement, which is moved by a work vehicle and has implement sections independently controllable utilizing an ASC system, is disclosed. The work vehicle display system includes a display device utilized within an operator station of the work vehicle and on which a map display is generated, a position tracking data source configured to provide data indicative of a position of the multi-section work implement, and a controller architecture operably coupled to the display device and to the position tracking data source. The controller architecture is operable in an ASC lookahead mode in which the controller architecture: (i) projects a future position of the multi-section work implement at a future timepoint based, at least in part, on data received from the position tracking data source; (ii) projects future operative states of the implement sections at the future timepoint when the implement sections are controlled by the ASC system; and (iii) generates ASC lookahead symbology on the map display visually indicating the projected future position of the multi-section work implement and the projected future operative states of the implement sections.

2. The work vehicle display system of example 1, wherein the controller architecture is configured to project the future position of the multi-section work implement utilizing data from the position tracking data source indicative of a current position, speed, and heading of the work vehicle. The controller architecture is further configured to recall geometry data from memory to estimate a current position of the work vehicle utilizing the current position of the work vehicle.

3. The work vehicle display system of example 1, wherein the controller architecture is configured to determine the future timepoint based, at least in part, on a command-to-execution lag period occurring between issuance of a command by the ASC system and execution of the command at the multi-section work implement.

4. The work vehicle display system of example 3, wherein the controller architecture is further configured to determine the command-to-execution lag period by: (i) identifying an implement type of the multi-section work implement; and (ii) recalling, from a memory accessible to the controller architecture, a command-to-execution lag period estimate corresponding to the identified implement type.

5. The work vehicle display system of example 1, the controller architecture is configured to generate the ASC lookahead symbology to include a future position implement graphic representative of the multi-section work implement at the future timepoint.

6. The work vehicle display system of example 1, wherein the controller architecture is further configured to: (i) identify a width of the multi-section work implement; and (iii) generate the future position implement graphic to have width corresponding to the identified width and scaled downwardly for presentation on the map display.

7. The work vehicle display system of example 5, wherein the controller architecture is further configured to generate on the map display a current position implement graphic representative of the multi-section work implement in a current position, as well as connecting line graphics extending generally from outer ends of the current position implement graphic to corresponding outer ends of the future position implement graphic.

8. The work vehicle display system of example 5, wherein the controller architecture is further configured to generate on the map display a current position implement graphic representative of the multi-section work implement in a current position, as well as an operative state transition graphic indicative of a transition in the current operative states of the implement sections.

9. The work vehicle display system of example 5, wherein the future position implement graphic includes segments representative of the implement sections. Additionally, the controller architecture is configured to visually indicate the projected future operative states of the implement sections by altering an appearance of the segments of the future position implement graphic.

10. The work vehicle display system of example 9, wherein the controller architecture is configured to alter the appearance of the segments of the future position implement graphic in accordance with a pre-established color coding scheme in which first and second coded colors denote different operational states of the implement sections.

11. The work vehicle display system of example 10, wherein the multi-section work implement includes a sprayer implement moved by the work vehicle through an environment. The first coded color indicates that an implement section is currently delivering a spray material to the environment, while the second coded color indicates that an implement section is not currently delivery the spray material.

12. The work vehicle display system of example 10, wherein the multi-section work implement includes an air seeder implement moved by the work vehicle over a field. The first coded color indicates that an implement section is currently delivering one or more seed-entrained airstreams to the field, while the second coded color indicates that an implement section is not currently delivery one or more seed-entrained airstreams.

13. The work vehicle display system of example 10, wherein the multi-section work implement includes a tillage implement moved by the work vehicle over a field. The first coded color indicates that an implement section is currently engaged into the field, while the second coded color indicates that an implement section is not currently engaged into the field.

14. The work vehicle display system of example 1, wherein the controller architecture is configured to: (i) repeatedly estimate a performance level of the ASC system when actively controlling the multi-section work implement; and (ii) generate additional symbology on the map display indicative of the estimated performance level of the ASC system.

15. In further embodiments, the work vehicle display system includes a display device utilized within an operator station of the work vehicle and on which a map display is generated, a position tracking data source configured to provide data indicative of a position of the multi-section work implement, and a controller architecture operably coupled to the display device and to the position tracking data source. The controller architecture is configured to: (i) repeatedly estimate a performance level of the ASC system when the ASC system is utilized to actively control the multi-section work implement; and (ii) generate, on the map display, symbology representative of the estimated performance level of the ASC system.

Conclusion

The foregoing has thus disclosed embodiments of work vehicle display systems and methods for generating symbology on map displays increasing operator awareness as to the manner in which operator driving behaviors (steering and speed change inputs) impact ASC performance levels. Embodiment of the work vehicle display system generate ASC lookahead symbology, which concurrently indicates a predicted future position of a multi-section work implement at a future timepoint and the predicted future operative states of the implement sections at the future timepoint. The ASC lookahead symbology may include, for example, a future position implement graphic having segments corresponding to the sections of the work implement, with the appearance of the segments color coded or otherwise modified to visually convey the future operative states of the implement sections. By glancing at the ASC lookahead symbology, an operator may quickly gain an enhanced understanding as the manner in which operator driving behaviors affect the timing of ASC commands and ASC performance levels. This, in turn, may enable an operator to adapt their driving behaviors to optimized ASC performance levels to the extent practical. Further, in at least some embodiments, the work vehicle display system may also generate symbology on a map display further indicating an instantaneous estimate of ASC performance levels.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A work vehicle display system utilized in conjunction with a multi-section work implement moved by a work vehicle through an agricultural space, the multi-section work implement having implement sections independently controllable utilizing an Automatic Section Control (ASC) system, the work vehicle display system comprising:
    a display device utilized within an operator station of the work vehicle and on which a map display is generated;
    a position tracking data source configured to provide data indicative of a position of the multi-section work implement; and
    a controller architecture operably coupled to the display device and to the position tracking data source, the controller architecture operable in an ASC lookahead mode in which the controller architecture:
        projects a future position of the multi-section work implement at a future timepoint based, at least in part, on data received from the position tracking data source;
        projects future operative states of the implement sections at the future timepoint when the implement sections are controlled by the ASC system; and
        generates ASC lookahead symbology on the map display visually indicating the projected future position of the multi-section work implement and the projected future operative states of the implement sections.

2. The work vehicle display system of claim 1, wherein the controller architecture is configured to project the future position of the multi-section work implement utilizing data from the position tracking data source indicative of a current position, speed, and heading of the work vehicle; and
    wherein the controller architecture is further configured to recall geometry data from a memory to estimate a current position of the work vehicle utilizing the current position of the work vehicle.

3. The work vehicle display system of claim 1, wherein the controller architecture is configured to determine the future timepoint based, at least in part, on a command-to-execution lag period occurring between issuance of a command by the ASC system and execution of the command at the multi-section work implement.

4. The work vehicle display system of claim 3, wherein the controller architecture is further configured to determine the command-to-execution lag period by:
    identifying an implement type of the multi-section work implement; and
    recalling, from a memory accessible to the controller architecture, a command-to-execution lag period estimate corresponding to the identified implement type.

5. The work vehicle display system of claim 1, the controller architecture is configured to generate the ASC lookahead symbology to include a future position implement graphic representative of the multi-section work implement at the future timepoint.

6. The work vehicle display system of claim 5, wherein the controller architecture is further configured to generate on the map display:
    a current position implement graphic representative of the multi-section work implement in a current position; and
    connecting line graphics extending generally from outer ends of the current position implement graphic to corresponding outer ends of the future position implement graphic.

7. The work vehicle display system of claim 5, wherein the controller architecture is further configured to generate on the map display:
    a current position implement graphic representative of the multi-section work implement in a current position; and
    an operative state transition graphic indicative of a transition in the current operative states of the implement sections.

8. The work vehicle display system of claim 5, wherein the future position implement graphic comprises segments representative of the implement sections; and
    wherein the controller architecture is configured to visually indicate the projected future operative states of the implement sections by altering an appearance of the segments of the future position implement graphic.

9. The work vehicle display system of claim 8, wherein the controller architecture is configured to alter the appearance of the segments of the future position implement graphic in accordance with a pre-established color coding scheme in which first and second coded colors denote different operational states of the implement sections.

10. The work vehicle display system of claim 9, wherein the multi-section work implement comprises a sprayer implement moved by the work vehicle through an environment;
    wherein the first coded color indicates that an implement section is currently delivering a spray material to the environment; and
    wherein the second coded color indicates that an implement section is not currently delivering the spray material.

11. The work vehicle display system of claim 9, wherein the multi-section work implement comprises an air seeder implement moved by the work vehicle over a field;
    wherein the first coded color indicates that an implement section is currently delivering one or more seed-entrained airstreams to the field; and
    wherein the second coded color indicates that an implement section is not currently delivering one or more seed-entrained airstreams.

12. The work vehicle display system of claim 9, wherein the multi-section work implement comprises a tillage implement moved by the work vehicle over a field;
    wherein the first coded color indicates that an implement section is currently engaged into the field; and
    wherein the second coded color indicates that an implement section is not currently engaged into the field.

13. The work vehicle display system of claim 1, wherein the controller architecture is further configured to:
    identify a width of the multi-section work implement; and
    generate the future position implement graphic to have width corresponding to the identified width and scaled downwardly for presentation on the map display.

14. The work vehicle display system of claim 1, wherein the controller architecture is configured to:

repeatedly estimate a performance level of the ASC system when actively controlling the multi-section work implement; and generate additional symbology on the map display indicative of the estimated performance level of the ASC system.

15. A work vehicle display system utilized in conjunction with a multi-section work implement moved by a work vehicle, the multi-section work implement having implement sections independently controllable utilizing an Automatic Section Control (ASC) system, the work vehicle display system comprising:

a display device utilized within an operator station of the work vehicle and on which a map display is generated;

a position tracking data source configured to provide data indicative of a position of the multi-section work implement; and a controller architecture operably coupled to the display device and to the position tracking data source, the controller architecture configured to:

repeatedly estimate a performance level of the ASC system when the ASC system is utilized to actively control the multi-section work implement; and generate, on the map display, symbology representative of the estimated performance level of the ASC system.

16. The work vehicle displays system of claim 15, wherein the controller architecture is configured to estimate the performance level of ASC system based, at least in part, on:

map data stored in a memory accessible to the controller architecture and identifying regions of an agricultural space targeted for treatment utilizing the multi-section work implement; and estimating a degree to which the targeted areas of the agricultural space are treated when passed over by the multi-section work implement, while under control of the ASC system.

17. The controller architecture of claim 15, wherein the controller architecture is further configured to:

project a future position of the multi-section work implement at a future timepoint based, at least in part, on data received from the position tracking data source;

project future operative states of the implement sections at the future timepoint when the implement sections are controlled by the ASC system; and further generate ASC lookahead symbology on the map display visually indicating the projected future position of the multi-section work implement and the projected future operative states of the implement sections.

18. The work vehicle display system of claim 15, wherein the multi-section work implement is selected from the group consisting of a multi-section sprayer implement, a multi-section air seeder implement, and a multi-section tillage implement.

19. A method carried-out by a work vehicle display system including a display device operable in a work vehicle utilized to move a multi-section work implement, the multi-section work implement having implement sections independently controllable utilizing an Automatic Section Control (ASC) system, the method comprising:

projecting, utilizing data received from the position tracking data source, a future position of the multi-section work implement at a future timepoint;

projecting, utilizing a controller architecture included in the work vehicle display system, future operative states of the implement sections at the future timepoint when the implement sections are controlled by the ASC system; and generating, on the display device, a map display including ASC lookahead symbology visually indicating the projected future position of the multi-section work implement and the projected future operative states of the implement sections.

20. The method of claim 19, further comprising arriving at the future timepoint by adding a command-to-execution lag period to a current time, the command-to-execution lag period representing a duration of time occurring between issuance of a command by the ASC system and full execution of the command at the multi-section work implement.

* * * * *